(12) United States Patent
Oulton (10) Patent No.: US 11,098,818 B2
(45) Date of Patent: Aug. 24, 2021

(54) MAGNETIC INDEX POSITIONER (71) Applicant: Halliburton Energy Services, Inc., Houston, TX (US)

(72) Inventor: Gary Oulton, Arbroath (GB)

(73) Assignee: Halliburton Energy Services, Inc., Houston, TX (US)

( * ) Notice: Subject to any disclaimer, the term of this patent is extended or adjusted under 35 U.S.C. 154(b) by 275 days.

(21) Appl. No.: 16/323,936

(22) PCT Filed: Feb. 10, 2017

(86) PCT No.: PCT/US2017/017294
§ 371 (c)(1),
(2) Date: Feb. 7, 2019

(87) PCT Pub. No.: WO2018/147857
PCT Pub. Date: Aug. 16, 2018

(65) Prior Publication Data
US 2019/0170269 A1    Jun. 6, 2019

(51) Int. Cl.
*F16K 31/08* (2006.01)
*E21B 23/00* (2006.01)
(Continued)

(52) U.S. Cl.
CPC .......... *F16K 31/084* (2013.01); *E21B 23/004* (2013.01); *E21B 34/06* (2013.01);
(Continued)

(58) Field of Classification Search
CPC .. F16K 31/084; F16K 11/0704; E21B 23/004; E21B 34/102
See application file for complete search history.

(56) References Cited

U.S. PATENT DOCUMENTS

| 5,127,286 A | 7/1992 | Wittig |
| 5,137,286 A | 8/1992 | Whitford |

(Continued)

FOREIGN PATENT DOCUMENTS

| CN | 202713115 U | 1/2013 |
| EP | 0991190 B1 | 2/2005 |

(Continued)

OTHER PUBLICATIONS

Machine Translation of Chinese Patent CN202713115 U, Passive permanent magnet coupling transmission, braking or load device.
(Continued)

*Primary Examiner* — Reinaldo Sanchez-Medina
*Assistant Examiner* — Nicole Gardner
(74) *Attorney, Agent, or Firm* — Scott Richardson; C. Tumey Law Group PLLC (57) ABSTRACT

A second mandrel is mounted to a first mandrel and is moveable longitudinally relative to the first mandrel among a plurality of index positions. A first-part magnetic element is coupled to the second mandrel. A plurality of second-part magnetic elements is coupled to the first mandrel at respective positions. The first-part magnetic element is adjacent to a respective one of the plurality of second-part magnetic elements when the second mandrel is at a respective index position. A threshold force F on the second mandrel applied for a threshold time T is required to displace the first-part magnetic element from the respective second-part magnetic element sufficiently that the first-part magnetic element will not return to be adjacent to the respective second-part magnetic element when the force F is removed.

20 Claims, 4 Drawing Sheets

(51) Int. Cl.
*F16K 31/56* (2006.01)
*E21B 34/06* (2006.01)
(52) U.S. Cl.
CPC .......... *E21B 34/063* (2013.01); *F16K 31/563* (2013.01); *E21B 2200/04* (2020.05)

(56) References Cited

U.S. PATENT DOCUMENTS

| | | | |
|---|---|---|---|
| 5,789,835 | A | 8/1998 | Obara |
| 6,439,891 | B1* | 8/2002 | Tate ........................ F16K 1/123 434/11 |
| 6,506,988 | B2 | 1/2003 | Sato et al. |
| 6,559,637 | B2 | 5/2003 | Miyata et al. |
| 6,566,865 | B2 | 5/2003 | Yasuda et al. |
| 6,926,094 | B2 | 8/2005 | Arntson et al. |
| 7,137,760 | B2 | 11/2006 | Boyl-Davis et al. |
| 7,165,630 | B2 | 1/2007 | Arnston et al. |
| 7,208,943 | B2 | 4/2007 | Godoy et al. |
| 7,230,419 | B2 | 6/2007 | Godoy et al. |
| 7,264,426 | B2 | 9/2007 | Buttrick, Jr. |
| 7,273,333 | B2 | 9/2007 | Buttrick, Jr. et al. |
| 7,284,571 | B2 | 10/2007 | Ozawa et al. |
| RE40,523 | E | 9/2008 | Miyata et al. |
| 7,488,144 | B2 | 2/2009 | Boyl-Davis et al. |
| 7,511,480 | B2 | 3/2009 | Steffen |
| 7,632,047 | B2 | 12/2009 | Buttrick, Jr. et al. |
| 7,800,358 | B2 | 9/2010 | Akiyama et al. |
| 7,832,372 | B2 | 11/2010 | Blank |
| 7,957,890 | B2 | 6/2011 | Enomoto |
| 8,038,155 | B2 | 10/2011 | Zheng et al. |
| 8,106,648 | B2 | 1/2012 | Sato |
| 8,474,789 | B2 | 7/2013 | Shimada et al. |
| 2004/0021108 | A1* | 2/2004 | Hallback ............... F16K 31/082 251/65 |
| 2007/0040135 | A1 | 2/2007 | Dyer et al. |
| 2007/0289734 | A1 | 12/2007 | McDonald et al. |
| 2011/0227563 | A1 | 9/2011 | Akahane et al. |
| 2013/0291657 | A1 | 11/2013 | Purekar et al. |
| 2013/0342032 | A1 | 12/2013 | Laurent |
| 2014/0191627 | A1 | 7/2014 | Takahashi et al. |
| 2016/0273303 | A1* | 9/2016 | Hajjari .................. E21B 21/103 |

FOREIGN PATENT DOCUMENTS

| | | |
|---|---|---|
| EP | 1223409 B1 | 11/2007 |
| WO | 9953284 A1 | 10/1999 |
| WO | 2008154983 A1 | 12/2008 |
| WO | 2011019645 A2 | 2/2011 |
| WO | 2011100834 A1 | 8/2011 |
| WO | 2015094168 A1 | 6/2015 |

OTHER PUBLICATIONS

Machine Translation of EP Patent 0991190 B1, Contactless switch for motor vehicle steering column.
International Searching Authority, Patent Cooperation Treaty, International Search Report and Written Opinion of the International Searching Authority, International Application No. PCT/US17/17294, which is a PCT parent to the instant application, dated Oct. 30, 2017.
Steve Constantinides, Director of Technology, Magnet FAQs, Arnold Magnetic Technologies Corporation, Magnetics 2013, Feb. 7, 2013, pp. 1-47, Orlando, Florida.
Machine Translation of WO 9953284 A1, Sensor device for detecting a torque and/or angle of rotation.
Machine Translation of WO 2008154983 A1, Device for balancing rotors.

* cited by examiner

MAGNETIC INDEX POSITIONER

BACKGROUND

It is common to use indexed devices in the oil field. For example, a ball valve with an indexing mechanism may be situated in a borehole to separate an upper completion zone from a lower completion zone. The ball valve may include an indexing part that reacts to operator-induced pressure changes in the borehole to transition through a series of states. For example, the ball valve may be open in one state and closed in another state. It is a challenge to operate the ball valve consistently to stay in either of the two states when it is constructed of materials whose properties change over time.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

The equipment and techniques described herein may be useful in sea-based systems, land-based systems, multilateral wells, all types of drilling systems, all types of rigs, measurement while drilling ("MWD")/logging while drilling ("LWD") environments, wired drillpipe environments, coiled tubing (wired and unwired) environments, wireline environments, and similar environments. Further, while the equipment and techniques described herein are described in the context of a ball valve, it will be understood that the equipment and techniques could be used in any situation requiring the positioning of an indexing part.

An indexing part replaces the collet mechanism often used to provide the indexing functionality in, for example a ball valve, with the forces of permanent magnets to set two or more indexing points. Sets of permanent magnets or sets of permanent magnets and low carbon rings are aligned to establish indexing points.

Figure 1:
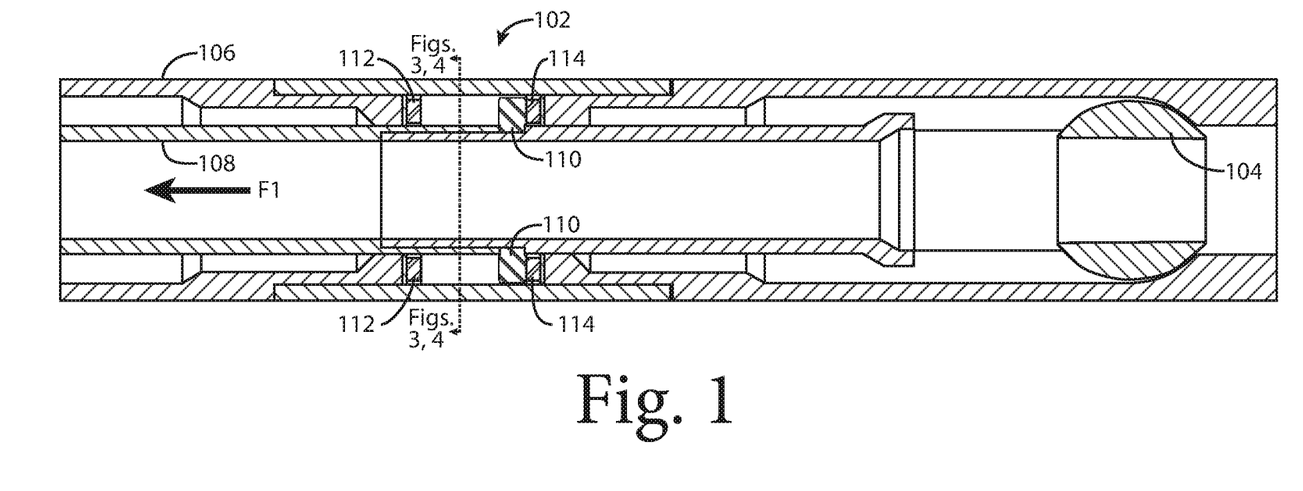
FIG. 1 is a longitudinal cross-sectional view of an indexing part in a first state in which a ball valve is open.

FIG. 1 is a longitudinal cross-sectional view of an indexing part 102 in a first state in which a ball valve 104 is open. The indexing part 102 includes a first mandrel 106 and a second mandrel 108. The second mandrel 108 is mounted to the first mandrel 106 and is moveable longitudinally relative to the first mandrel 106 among a plurality of index positions. In one or more embodiments, as shown in FIGS. 1-4, the second mandrel 108 is mounted within the first mandrel 106. In one or more embodiments, the first mandrel 106 is mounted within the second mandrel 108.

The indexing part 102 includes a first-part magnetic element 110 coupled to the second mandrel 108. The first-part magnetic element 110 may be a ring of low carbon steel that has good magnetic characteristics susceptibility (i.e., is readily attracted to a magnet). The first-part magnetic element 110 may be a magnetic ring or magnets arranged in a ring.

The indexing part 102 includes a plurality of second-part magnetic elements 112, 114 coupled to the first mandrel 106 at respective positions. The first-part magnetic element 110 is adjacent to a first of the second-part magnetic elements 112 when the second mandrel 108 is at a first index position in the indexing part state illustrated in FIG. 1 in which the ball valve 104 is open.

Figure 2:
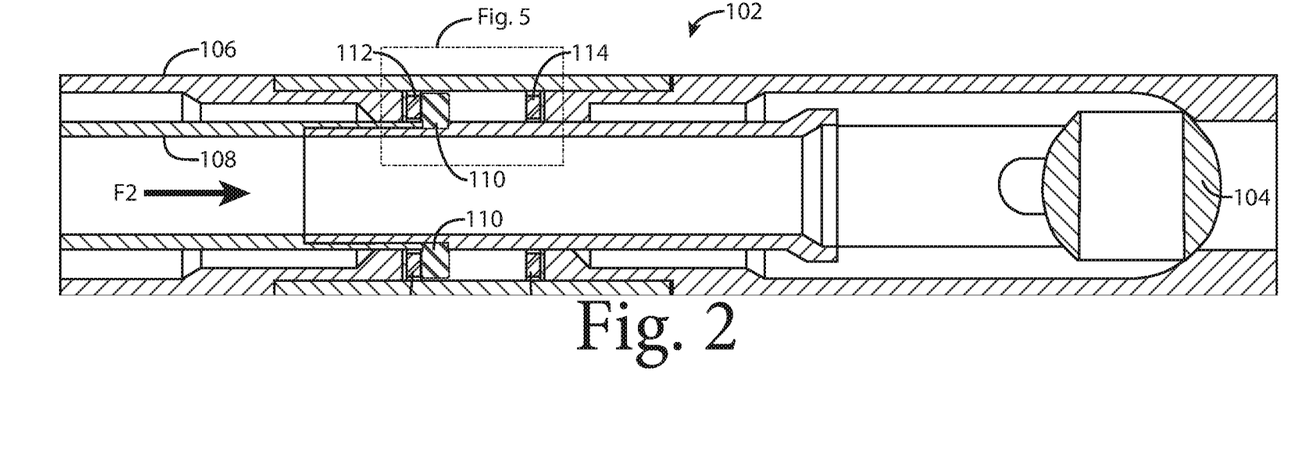
FIG. 2 is a longitudinal cross-sectional view of the indexing part of FIG. 1 in a second state in which the ball valve is closed.

FIG. 2 is a longitudinal cross-sectional view of the indexing part of FIG. 1 in a second state in which a ball valve is closed. The first-part magnetic element 110 is adjacent to a second of the second-part magnetic elements 114 when the second mandrel 108 is at a second index position in the indexing part state illustrated in FIG. 2 in which the ball valve 104 is closed.

The indexing part 102 is operated, for example to move the indexing part from the state shown in FIG. 1 to the state shown in FIG. 2 or vice versa, by applying a force from outside the indexing part 102. When the indexing part 102 is in a borehole for use in oil field drilling, completion, or production, for example, the force may be applied from the surface through other equipment such as a drill string or the force may be applied locally, for example, by a downhole motor.

Applying a threshold force with a magnitude F for a threshold time T on the second mandrel 108 is required to displace the first-part magnetic element 110 from the respective second-part magnetic element 112, 114 to or beyond a break-away position such that the first-part magnetic element 110 will not return to be adjacent to the respective second-part magnetic element 112, 114 when the force F is removed. Note that F and T are inversely proportional; that is, T is smaller for a larger F and T is larger for a smaller F, although F is greater than the attractive force between the first-part magnetic element 110 and the respective second-part magnetic element 112, 114. Thus, a force F1 having magnitude F in the direction shown in FIG. 1 applied for a threshold time T1 is required to displace the first-part magnetic element 110 from the second-part magnetic element 114 to a first break-away position such that the first-part magnetic element 110 will not return to be adjacent to the second-part magnetic element 114 when the force F1 is removed. Applying a force less than F1 or applying the force for less than the threshold time T1 will move the second mandrel in the direction of the arrow of force F1 away from the second-part magnetic element 114 but not to or beyond the first break-away position, so the first-part magnetic element 110 will move back adjacent to the second-part magnetic element 114 when the force is removed.

Similarly, a force F2 having magnitude F in the direction shown in FIG. 2 applied for a threshold time T2 is required to displace the first-part magnetic element 110 from the second-part magnetic element 112 to or beyond a second break-away position such that the first-part magnetic element 110 will not return to be adjacent to the second-part magnetic element 112 when the force F2 is removed. Applying a force less than F2 or applying the force for less than the threshold time T2 will move the second mandrel in the direction of the arrow of force F2 away from the second-part magnetic element 112 but not to or beyond the second break-away position, so the first-part magnetic element 110 will move back adjacent to the second-part magnetic element 112 when the force is removed.

Figure 3:
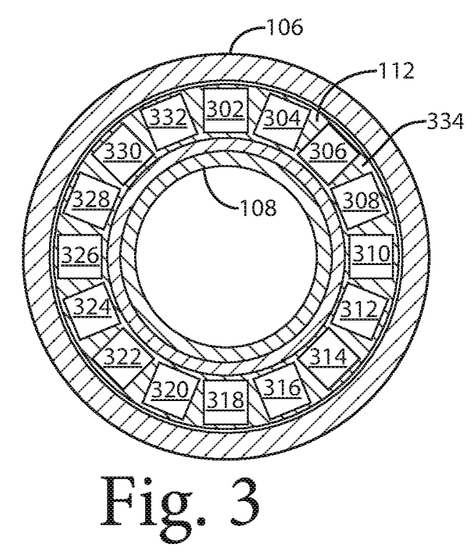
FIG. 3 is an axial cross-sectional view of the indexing part of FIG. 1 having a second-part magnetic element with a full set of permanent magnets.

FIG. 3 is an axial cross-sectional view of the indexing part 102 of FIG. 1 having a second-part magnetic element 112 with a full set of permanent magnets. As can be seen, the second-part magnetic element 112 includes 16 permanent magnet segments 302, 304, 306, 308, 310, 312, 314, 316, 318, 320, 322, 324, 326, 328, 330, 332 embedded in a substrate 334 to form a ring. Assuming the first-part magnetic element 110 is made of a magnetically susceptible material, such as steel or iron and (for simplicity) ignoring any interactions among the permanent magnet segments 302, 304, 306, 308, 310, 312, 314, 316, 318, 320, 322, 324, 326, 328, 330, 332 and between the permanent magnetic segments 302, 304, 306, 308, 310, 312, 314, 316, 318, 320, 322, 324, 326, 328, 330, 332 and the substrate 334, both believed to be minor, the force F holding the first-part magnetic element 110 to the second-part magnetic element 112 when they are in the positions shown in FIG. 1, is:

$$F = NB^2 A \mu \quad (1)$$

where:
N=the number of permanent magnet segments 302, 304, 306, 308, 310, 312, 314, 316, 318, 320, 322, 324, 326, 328, 330, 332;
B=flux density on the pole face of the permanent magnet segments 302, 304, 306, 308, 310, 312, 314, 316, 318, 320, 322, 324, 326, 328, 330, 332;
A=the area of the pole face of the permanent magnet segments 302, 304, 306, 308, 310, 312, 314, 316, 318, 320, 322, 324, 326, 328, 330, 332; and
μ=the permeability of the first-part magnetic element 110 material.

As can be seen, the force F coupling the first-part magnetic element 110 to the second-part magnetic element 112 depends, all other things being equal and ignoring what are believed to be minor effects, on the number of permanent magnet segments. The embodiment shown in FIG. 1 includes 16 permanent magnet segments 302, 304, 306, 308, 310, 312, 314, 316, 318, 320, 322, 324, 326, 328, 330, 332. The force F can be changed by changing N, B, A, and/or μ.

Figure 4:
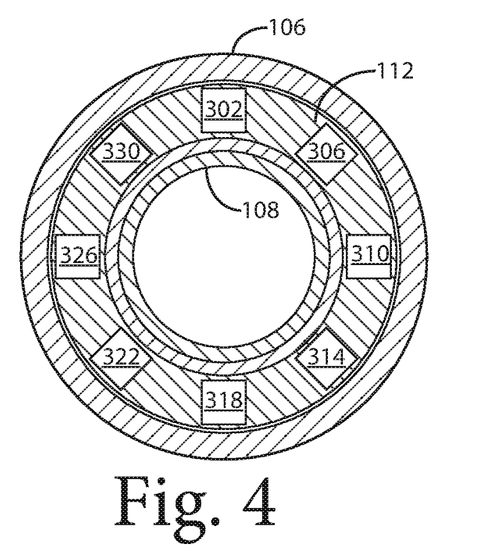
FIG. 4 is an axial cross-sectional view of the indexing part of FIG. 1 having a second-part magnetic element with a reduced set of permanent magnets.

FIG. 4 is an axial cross-sectional view of the indexing part of FIG. 1 having a second-part magnetic element 112, 114 with a reduced set of permanent magnets. Rather than 16 permanent magnet segments, as shown in FIG. 3, the embodiment illustrated in FIG. 4 has only 8 permanent magnet segments 302, 306, 310, 314, 318, 322, 326, 330. Therefore, for the embodiment shown in FIG. 4, the force F coupling the first-part magnetic element 110 to the second-part magnetic element 112 is one half the force for the embodiment shown in FIG. 3, all other things being equal and ignoring the minor effects discussed above. It will be understood that the embodiment shown in FIG. 4 is merely an example and that the number of permanent magnet segments is variable. More generally, assume that the maximum force $F_M$ is produced by a maximum number $N_M$ of permanent magnet segments. In that case, the reduced force $F_R$ produced by a reduced number $N_R$ of magnets, all other things being equal and ignoring the minor effects discussed above, is:

$$F_R = F_M \frac{N_R}{N_M} \quad (2)$$

The same principles apply to the force coupling the first-part magnetic element 110 to the second-part magnetic element 114.

Further, the second-part magnetic element 112 may have a different number of permanent magnets than the second-part magnetic element 114. In that case, the magnitude of the force F1 and/or the threshold time T1 required to break the first-part magnetic element 110 from the second-part magnetic element 114 will be different from the force F2 and/or the threshold time T2 required to break the first-part magnetic element 110 from the second-part magnetic element 112. In one or more embodiments, F1=F2 and/or T1=T2.

Further, rather than the permanent magnet segments 302, 304, 306, 308, 310, 312, 314, 316, 318, 320, 322, 324, 326, 328, 330, 332 being part of the second-part magnetic elements 112, 114, the permanent magnet segments 302, 304, 306, 308, 310, 312, 314, 316, 318, 320, 322, 324, 326, 328, 330, 332 may be part of the first-part magnetic element 110 and the second-part magnetic elements 112, 114 may be made of soft carbon material.

Still further, the first-part magnetic element 110 and one or both of the second-part magnetic elements 112, 114 may include permanent magnet segments. In that case, the magnetic attraction between the first-part magnetic element 110 and the second-part magnetic element(s) 112, 114 that include permanent magnet segments would be stronger.

Figure 5:
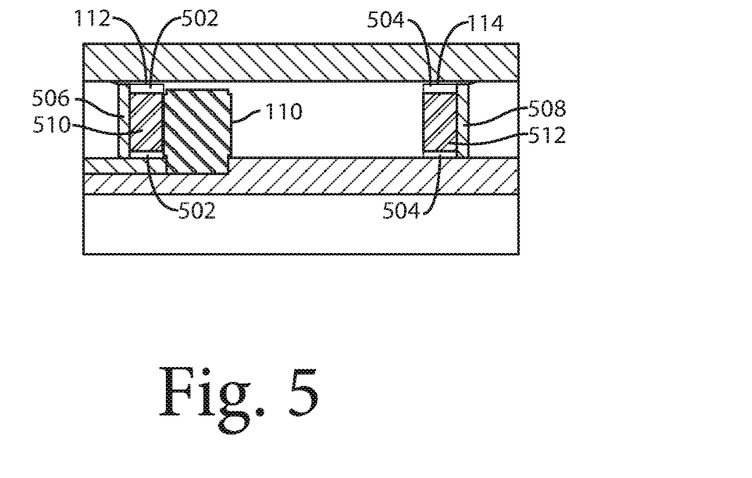
FIG. 5 is a longitudinal cross-sectional view of a detail of the cross-sectional view shown in FIG. 2.

FIG. 5 is a longitudinal cross-sectional view of a detail of the cross-sectional view shown in FIG. 2. Each of the second-part magnetic elements 112, 114 includes a magnet holder 502, 504, a backing plate 506, 508, and permanent magnet segments 510, 512, which may be one of the permanent magnet segments 302, 304, 306, 308, 310, 312, 314, 316, 318, 320, 322, 324, 326, 328, 330, shown in FIGS. 3 and 4.

Figure 6:
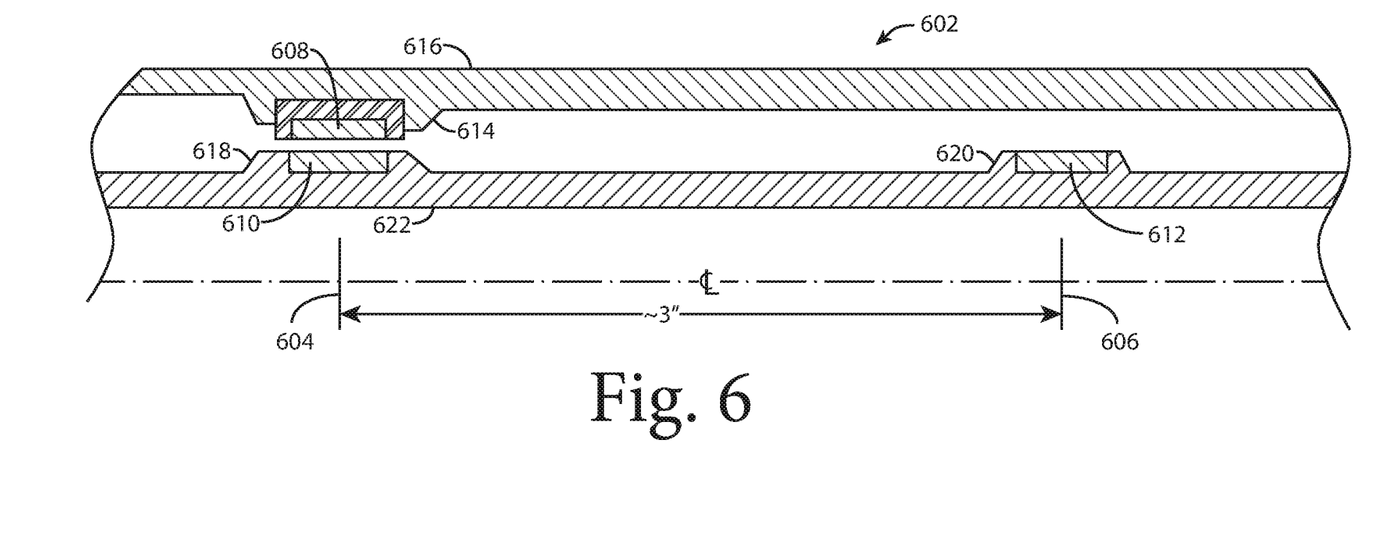
FIG. 6 is a longitudinal cross-sectional view of an indexing part with two or more non-contacting indexing points.

FIG. 6 is a longitudinal cross-sectional view of an indexing part 602 with two or more non-contacting indexing points 604, 606. The indexing part 602 includes a first-part magnetic element 608, a second-part magnetic element 610 at indexing point 604, and a second-part magnetic element 612 at indexing point 606. The first-part magnetic element 608 is coupled to a raised portion 614 of a first mandrel 616 and the second-part magnetic elements 610, 612 are coupled to respective raised portions 618, 620 of a second mandrel 622. The first-part magnetic element 608 may be a low carbon ring or it can be a ring of permanent magnet segments. Similarly, one or both of the second-part magnetic elements 610, 612 can be low carbon rings or one or both can be rings of permanent magnet segments. As can be seen, the first-part magnetic element 608 does not make physical contact with the second-part magnetic elements 610, 612. As before, the second mandrel 622 moves longitudinally relative to the first mandrel 616. Magnetic attraction between the first-part magnetic element 608 and the second-part magnetic elements 610, 612 causes the second mandrel 622 to be locked to the first mandrel 616 at the respective indexing points 604, 606 until a threshold force F is applied for a threshold time T in either direction. It will be understood that additional second-part magnetic elements can be added resulting in an indexing part with more than two indexing points.

Figure 7:
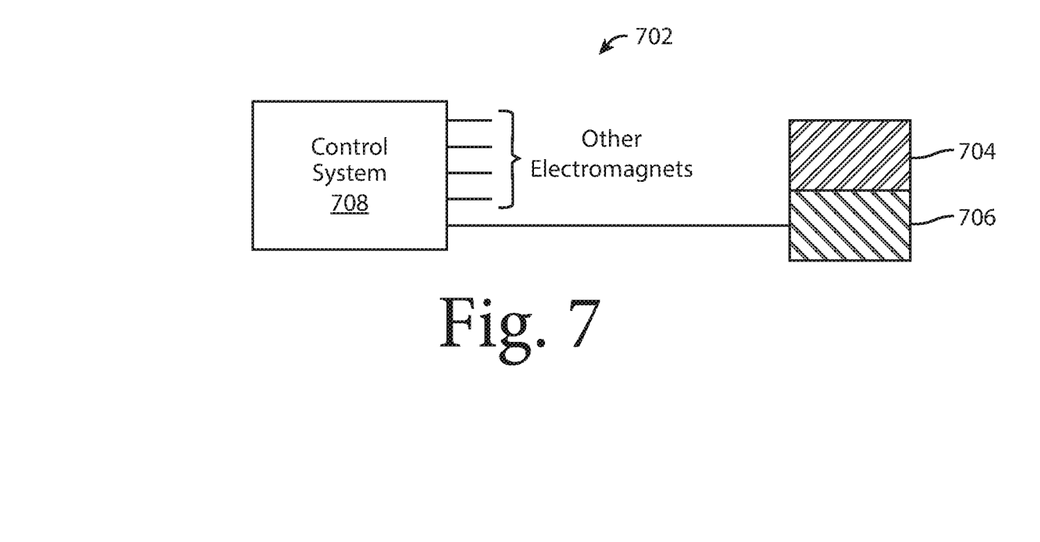
FIG. 7 shows a block diagram of an electromagnetic intervention to neutralize a permanent magnet to eliminate an indexing point or to change the force required to separate a first-part magnetic element from a second-part magnetic element.

FIG. 7 shows a block diagram of an electromagnetic intervention 702 to neutralize a permanent magnet (e.g., one of the permanent magnet segments 302, 304, 306, 308, 310, 312, 314, 316, 318, 320, 322, 324, 326, 328, 330 or second-part magnetic elements 610, 612 if they are permanent magnet segments) to eliminate an indexing point (e.g., the indexing point in which the first-part magnetic element 110 is adjacent the second part magnetic element 114 as in FIG. 1, the indexing point in which the first-part magnetic element 110 is adjacent the second part magnetic element 112, indexing points 604 or 606) or to change the force F required and/or the threshold time T that the force F is required to be applied to separate a first-part magnetic element 110, 608 from a second-part magnetic element 112, 114, 610, 612.

The electromagnetic intervention 702 operates on one of the permanent magnet segments 704 (e.g., one of the permanent magnet segments 302, 304, 306, 308, 310, 312, 314, 316, 318, 320, 322, 324, 326, 328, 330 or second-part magnetic elements 610, 612 if they are permanent magnet segments). An electromagnet 706 is positioned in close proximity to the permanent magnet segment 704. A control system 708 selectively applies power to the electromagnet 706, applies power of selectable amounts and polarities to the electromagnet 706, and removes power from the electromagnet 706. "Close proximity" is defined in this context to mean adjacent or close enough that at least 50 percent of the 3 decibel (dB) curve of the magnitude of the magnetic field of the permanent magnet segment 704 falls within the space between the point in space having the maximum of the magnitude of the magnetic field of the electromagnet 706 and the 3 decibel curve of the magnitude of the magnetic field of the electromagnet 706.

The electromagnet 706 is designed so that if power of an intervention magnitude and polarity is applied by the control system 708, the magnetic field generated by the electromagnet 706 offsets the magnetic field of the permanent magnet segment 704 so that the combination of the two produces a relatively weak magnetic field. For example, if this arrangement is applied to the second-part magnetic element 610 (assuming it is a permanent magnet segment) in FIG. 6, the control system 708 could disable the indexing point 606 by applying power of the intervention magnitude and polarity to the electromagnet 706. Similarly, the second-part magnetic element 112 of FIG. 3 could be converted to a close analog to the second-part magnetic element 112 of FIG. 4 by applying the arrangement of FIG. 7 to permanent magnet segments 304, 308, 312, 316, 320, 324, 328, and 332 and applying power of the intervention magnitude and polarity to the associated electromagnets 706.

The electromagnet is also designed so that if power of a strengthening magnitude and polarity is applied by the control system 708, the magnetic field generated by the electromagnet 706 enhances the magnetic field of the permanent magnet segment 704 so that the combination of the two produces a stronger magnetic field than the permanent magnet segment 704 alone. In this way, for example, the breaking forces F1 (see FIG. 1) and F2 (see FIG. 2) and threshold times T1 and T2 or the forces and threshold times required to break the first-part magnetic element 610 from one or both of the second-part magnetic elements 610, 612 (see FIG. 6) can be increased.

Further, the control system 708 may have the ability to vary the magnitude of the magnetic field produced by the electromagnet 706 continuously or in small discrete steps, as would be produced by a digital to analog converter, for example. The control system 708 may be able to modify the performance of other permanent magnet segments through its connections to other electromagnets, as shown in FIG. 7.

Figure 8:
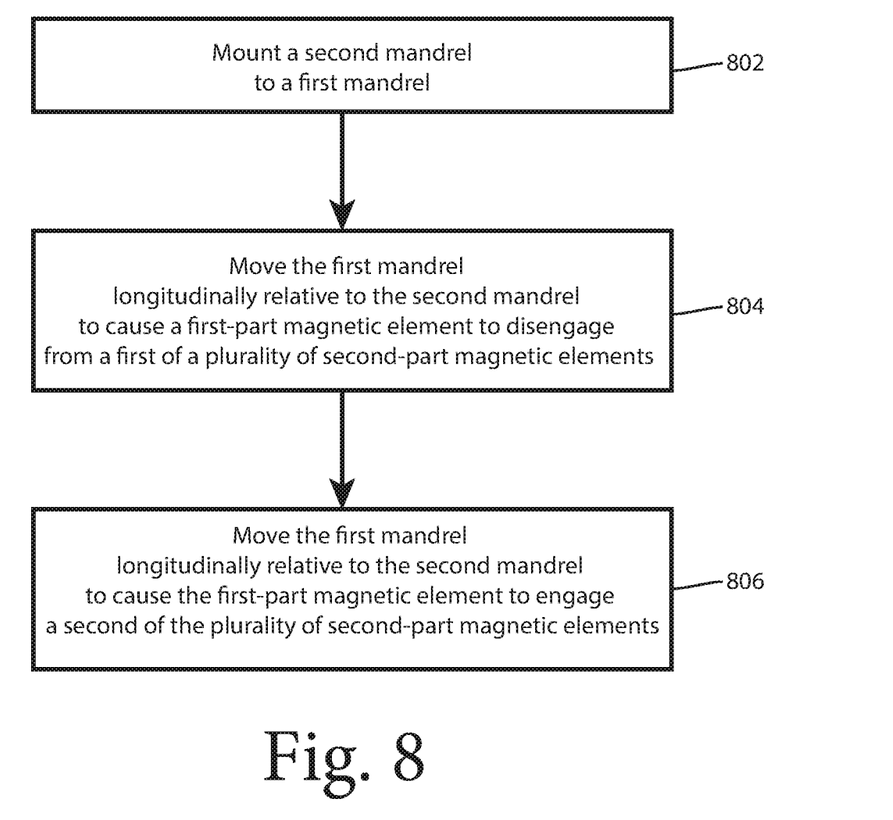
FIG. 8 is a flow chart showing use of the indexing part.

FIG. 8 is a flow chart showing use of the indexing part 102, 602. The flow chart begins with block 802, in which a second mandrel, such as second mandrel 108, is mounted to a first mandrel, such as first mandrel 106. In block 804, the first mandrel is moved longitudinally relative to the second mandrel to cause a first-part magnetic element, such as first-part magnetic element 110, 608, to disengage from a first of a plurality of second-part magnetic elements, such as second-part magnetic element 112, 610. In block 806, the first mandrel is moved longitudinally relative to the second mandrel to cause the first-part magnetic element to engage a second of the plurality of second-part magnetic elements, such as second part magnetic element 114, 612.

In one aspect, an apparatus includes a first mandrel, a second mandrel mounted to the first mandrel and moveable longitudinally relative to the first mandrel among a plurality of index positions, a first-part magnetic element coupled to the second mandrel, and a plurality of second-part magnetic elements coupled to the first mandrel at respective positions. The first-part magnetic element is adjacent to a respective one of the plurality of second-part magnetic elements when the second mandrel is at a respective index position. A threshold force F on the second mandrel applied for a threshold time T is required to displace the first-part magnetic element from the respective second-part magnetic element sufficiently that the first-part magnetic element will not return to be adjacent to the respective second-part magnetic element when the force F is removed.

Implementations may include one or more of the following. The second mandrel may be mounted within the first mandrel. The first mandrel may be mounted within the second mandrel. At least one of the plurality of second-part magnetic elements may include a plurality of magnetic segments arranged in a ring. At least one of the plurality of second-part magnetic elements may include a plurality of low carbon segments arranged in a ring. The first-part magnetic element may include a plurality of magnetic segments arranged in a ring. The first-part magnetic element may include a plurality of low carbon segments arranged in a ring. The first-part magnetic element may be coupled to a raised portion of the first mandrel. One of the plurality of second-part magnetic elements may be coupled to a raised portion of the second mandrel. A first of the plurality of second-part magnetic elements may establish a first stop. A second of the plurality of second-part magnetic elements may establish a second stop. The first mandrel may be moveable relative to the second mandrel from a first point at which the first part magnetic element engages the first of the plurality of second-part magnetic elements to a second point at which the first-part magnetic element engages the second of the second-part magnetic elements. The first mandrel may be moveable from the first position by application of a force greater than a first threshold force F1 in a first direction. The first mandrel may be moveable from the second position by application of a force greater than a second threshold force F2 in a second direction, the second direction being opposite the first direction.

In one aspect, a method includes mounting a second mandrel to a first mandrel, moving the first mandrel longitudinally relative to the second mandrel to cause a first-part magnetic element to disengage from a first of a plurality of second-part magnetic elements, and moving the first mandrel longitudinally relative to the second mandrel to cause the first-part magnetic element to engage a second of the plurality of second-part magnetic elements.

Implementations may include one or more of the following. Moving may include applying a force greater than a threshold force F for a threshold time T. The force F may be in a direction D and movement of the first mandrel relative to the second element in direction D may be stopped by a magnetic interaction between the first-part magnetic element and the second of the plurality of second-part magnetic elements. The force F may be in a direction D and movement of the first mandrel relative to the second element in direction D may be stopped by a mechanical interaction between the first-part magnetic element and the second of the plurality of second-part magnetic elements.

In one aspect, a system includes a first mandrel, a second mandrel mounted to the first mandrel and moveable longitudinally relative to the first mandrel among a plurality of index positions, a first-part magnetic element coupled to the second mandrel, and a plurality of second-part magnetic elements coupled to the first mandrel at respective positions. The first-part magnetic element is adjacent to a respective one of the plurality of second-part magnetic elements when the second mandrel is at a respective index position. A threshold force F on the second mandrel applied for a threshold time T is required to displace the first-part magnetic element from the respective second-part magnetic element sufficiently that the first-part magnetic element will not return to be adjacent to the respective second-part magnetic element when the force F is removed. The system includes an electromagnetic intervention that adjusts the force F by interacting with a magnetic field of a permanent magnet.

Implementations may include one or more of the following. At least one of the plurality of second-part magnetic elements may include a plurality of permanent magnet segments arranged in a ring. The electromagnetic intervention may include an electromagnet located in close proximity to one of the permanent magnet segments. A magnetic field generated by the electromagnet powered by an electrical signal of a cancelling magnitude and cancelling polarity may counteract the magnetic field generated by the permanent magnet segment to which it is in close proximity. A magnetic field generated by the electromagnet powered by an electrical signal of a cancelling magnitude and cancelling polarity may enhance the magnetic field generated by the permanent magnet segment to which it is in close proximity. The electromagnetic intervention may have a plurality of electromagnets, each located in close proximity to a respective one of the plurality of permanent magnet segments. The system may include a control system electrically coupled to the plurality of electromagnets to apply power of selectable magnitudes and polarities to each of the plurality of electromagnets. One of the plurality of second-part magnetic elements may include a magnetic ring.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
   a first mandrel;
   a second mandrel mounted to the first mandrel and moveable longitudinally relative to the first mandrel among a plurality of index positions, wherein the second mandrel moves from a force applied by a drill string, a downhole motor, or a ball valve;
   a first-part magnetic element coupled to the second mandrel; and
   a plurality of second-part magnetic elements coupled to the first mandrel at respective positions, such that:
      the first-part magnetic element is adjacent to a respective one of the plurality of second-part magnetic elements when the second mandrel is at a respective index position, and
      a threshold force F on the second mandrel applied for a threshold time T is required to displace the first-part magnetic element from the respective second-part magnetic element sufficiently that the first-part magnetic element will not return to be adjacent to the respective second-part magnetic element when the threshold force F is removed.

2. The apparatus of claim 1 wherein:
   the second mandrel is mounted within the first mandrel.

3. The apparatus of claim 1 wherein:
   the first mandrel is mounted within the second mandrel.

4. The apparatus of claim 1 wherein at least one of the plurality of second-part magnetic elements comprises a plurality of magnetic segments arranged in a ring.

5. The apparatus of claim 1 wherein at least one of the plurality of second-part magnetic elements comprises a plurality of low carbon segments arranged in a ring.

6. The apparatus of claim 1 wherein the first-part magnetic element comprises a plurality of magnetic segments arranged in a ring.

7. The apparatus of claim 1 wherein the first-part magnetic element comprises a plurality of low carbon segments arranged in a ring.

8. The apparatus of claim 1 wherein:
   the first-part magnetic element is coupled to a raised portion of the first mandrel; and
   one of the plurality of second-part magnetic elements is coupled to a raised portion of the second mandrel.

9. The apparatus of claim 1 wherein:
   a first of the plurality of second-part magnetic elements establishes a first stop;
   a second of the plurality of second-part magnetic elements establishes a second stop;
   the first mandrel is moveable relative to the second mandrel from a first point at which the first-part magnetic element engages the first of the plurality of second-part magnetic elements to a second point at which the first-part magnetic element engages the second of the second-part magnetic elements.

10. The apparatus of claim 9 wherein:
the first mandrel is moveable from the first position by application of theft force greater than a first threshold force F1 in a first direction; and
the first mandrel is moveable from the second position by application of the force greater than a second threshold force F2 in a second direction, the second direction being opposite the first direction.

11. A method comprising:
mounting a second mandrel to a first mandrel;
moving the first mandrel longitudinally relative to the second mandrel with a force applied by a drill string, a downhole motor, or a ball valve to cause a first-part magnetic element to disengage from a first of a plurality of second-part magnetic elements; and
moving the first mandrel longitudinally relative to the second mandrel with the force applied by the drill string, the downhole motor, or the ball valve to cause the first-part magnetic element to engage a second of the plurality of second-part magnetic elements.

12. The method of claim 11 wherein moving comprises applying the force greater than a threshold force F for a threshold time T.

13. The method of claim 12 wherein the threshold force F is in a direction D and movement of the first mandrel relative to the second mandrel in direction D is stopped by a magnetic interaction between the first-part magnetic element and the second of the plurality of second-part magnetic elements.

14. The method of claim 12 wherein the threshold force F is in a direction D and movement of the first mandrel relative to the second mandrel in direction D is stopped by a mechanical interaction between the first-part magnetic element and the second of the plurality of second-part magnetic elements.

15. A system comprising:
a first mandrel;
a second mandrel mounted to the first mandrel and moveable longitudinally relative to the first mandrel among a plurality of index positions, wherein the second mandrel moves from a force applied by a drill string, a downhole motor, or a ball valve a first-part magnetic element coupled to the second mandrel; and
a plurality of second-part magnetic elements coupled to the first mandrel at respective positions, such that:
the first-part magnetic element is adjacent to a respective one of the plurality of second-part magnetic elements when the second mandrel is at a respective index position, and
a threshold force F on the second mandrel applied for a threshold time T is required to displace the first-part magnetic element from the respective second-part magnetic element sufficiently that the first-part magnetic element will not return to be adjacent to the respective second-part magnetic element when the threshold force F is removed; and
an electromagnetic intervention that adjusts the force F by interacting with a magnetic field of a permanent magnet.

16. The system of claim 15 wherein at least one of the plurality of second-part magnetic elements comprises a plurality of permanent magnet segments arranged in a ring.

17. The system of claim 16 wherein the electromagnetic intervention comprises an electromagnet located in close proximity to one of the permanent magnet segments.

18. The system of claim 17 wherein a magnetic field generated by the electromagnet powered by an electrical signal of a cancelling magnitude and cancelling polarity modifies the magnetic field generated by the permanent magnet segment to which it is in close proximity.

19. The system of claim 16 wherein:
the electromagnetic intervention has a plurality of electromagnets, each located in close proximity to a respective one of the plurality of permanent magnet segments; and
the system further comprises a control system electrically coupled to the plurality of electromagnets to apply power of selectable magnitudes and polarities to each of the plurality of electromagnets.

20. The system of claim 15 wherein one of the plurality of second-part magnetic elements comprises a magnetic ring.

* * * * *